US008699698B2

(12) United States Patent
Fagundes

(10) Patent No.: US 8,699,698 B2
(45) Date of Patent: Apr. 15, 2014

(54) AGENT SELECTABLE PROCESS FOR MANAGING CONTACT CENTER COMMUNICATIONS

(75) Inventor: Luciano Godoy Fagundes, Sao Paulo (BR)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 13/407,930

(22) Filed: Feb. 29, 2012

(65) Prior Publication Data

US 2013/0223609 A1 Aug. 29, 2013

(51) Int. Cl.
*H04M 3/00* (2006.01)
(52) U.S. Cl.
USPC .................................. 379/266.01; 379/265.09
(58) Field of Classification Search
USPC ............. 379/265.01, 265.02, 265.03, 265.05, 379/265.11, 265.12, 265.13, 266.01, 379/266.02, 265.09
See application file for complete search history.

(56) References Cited

U.S. PATENT DOCUMENTS 6,173,052 B1 * 1/2001 Brady ...................... 379/265.01
2010/0246800 A1 * 9/2010 Geppert et al. .......... 379/265.09

OTHER PUBLICATIONS

Luciano Godoy Fagundes, U.S. Patent Application entitled "Scheduling an Agent Based on a Contact Center History," filed Feb. 2, 2012, U.S. Appl. No. 13/365,007, 29 pages.

* cited by examiner

*Primary Examiner* — Antim Shah

(57) ABSTRACT

Communication requests (i.e., voice, video, text) are received at a contact center. The communication requests are presented to a contact center agent. The agent selects one of the communication requests. In response to the agent selecting the communication request, a communication is established between the agent and an initiator of the communication request. The communication requests can also be presented to multiple agents to allow each agent to select a specific communication to handle. Alternatively, in an out-bound call center, communication requests are generated in the call center. The communication requests are presented to the agent and the agent selects one of the communication requests. In response to the agent selecting the communication request, a communication is initiated to an address of the communication request. The out-bound communication requests can also be presented to multiple agents to allow each agent to select a specific communication to handle.

12 Claims, 6 Drawing Sheets

AGENT SELECTABLE PROCESS FOR MANAGING CONTACT CENTER COMMUNICATIONS

TECHNICAL FIELD

The system and method relates to contact centers and in particular to contact centers where an agent selects a communication to manage.

BACKGROUND

Traditional contact centers use various routing algorithms to route an incoming communication to a specific agent. The communications are routed to the various agents based on criteria, such as phone numbers, information entered by a customer in an Interactive Voice Response (IVR) system, customer preference information, prior contact information, product type, and the like. When the in-bound communications reach the contact center, based on the criteria, a specific agent will be selected to handle the communication. When the agent completes the communication, a second communication is then routed to the agent; the agent will process the second communication in a similar manner as the first. In this model, the agent is not involved in the process of selecting which communications the agent will handle. Instead, the agent just handles the communications that are routed to him.

In contact centers that provide out-bound communications, the contact center initiates an out-bound call to a customer. Once a call is answered by a customer, a particular agent that is available is selected to handle the call. After handling the call, when the agent becomes available, the contact center connects the agent with the next available customer who has been called by the contact center. Again, in this model, the contact center selects which agent will handle the call based on criteria such as the agent being available. Like in the in-bound model, the agent is not involved in the process of determining which calls the agent will handle.

SUMMARY

The system and method are directed to solving these and other problems and disadvantages of the prior art. Communication requests (i.e., voice, video, text) are received at a contact center. The communication requests are presented to a contact center agent. The agent selects one of the communication requests. In response to the agent selecting the communication request, a communication is established between the agent and an initiator of the communication request. The communication requests can also be presented to multiple agents to allow each agent to select a specific communication to handle.

Alternatively, in an out-bound call center, communication requests are generated in the call center. The communication requests are presented to the agent and the agent selects one of the communication requests. In response to the agent selecting the communication request, a communication is initiated to an address of the communication request. The out-bound communication requests can also be presented to multiple agents to allow each agent to select a specific communication to handle.

Other embodiments allow the agent to recommend a communication request to another agent. The agent can provide information that may be helpful for the other agent to handle the communication.

The communication requests that are seen by each agent can be customized based on different types of information. For example, the communication requests that each agent sees can be different based on a prior interaction with the customer by one of the agents.

The communication requests can be presented to the agents in various ways. In one embodiment, the communication requests are represented with a picture representation of the initiator of the communication request.

In yet another embodiment, a supervisor can override the agent by selecting a communication request to automatically establish a communication between the agent and the initiator of the communication request.

The communication requests can also be filtered based on information about the communication requests. For example, the communication requests can be filtered based on a product type.

BRIEF DESCRIPTION OF THE DRAWINGS

In order to describe the manner in which other advantages and features of the disclosure can be obtained, a more particular description of the principles briefly described below will be rendered by reference to specific embodiments thereof, which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

In the appended Figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

The following description and associated Figures teach various modes of the invention. The following claims specify the scope of the invention. Note that some aspects of the various modes may not fall within the scope of the invention as specified by the claims. Those skilled in the art will appreciate that the features described below can be combined in various ways to form multiple variations of the invention. As a result, the invention is not limited to the specific examples described below, but only by the claims and their equivalents.

Figure 1:
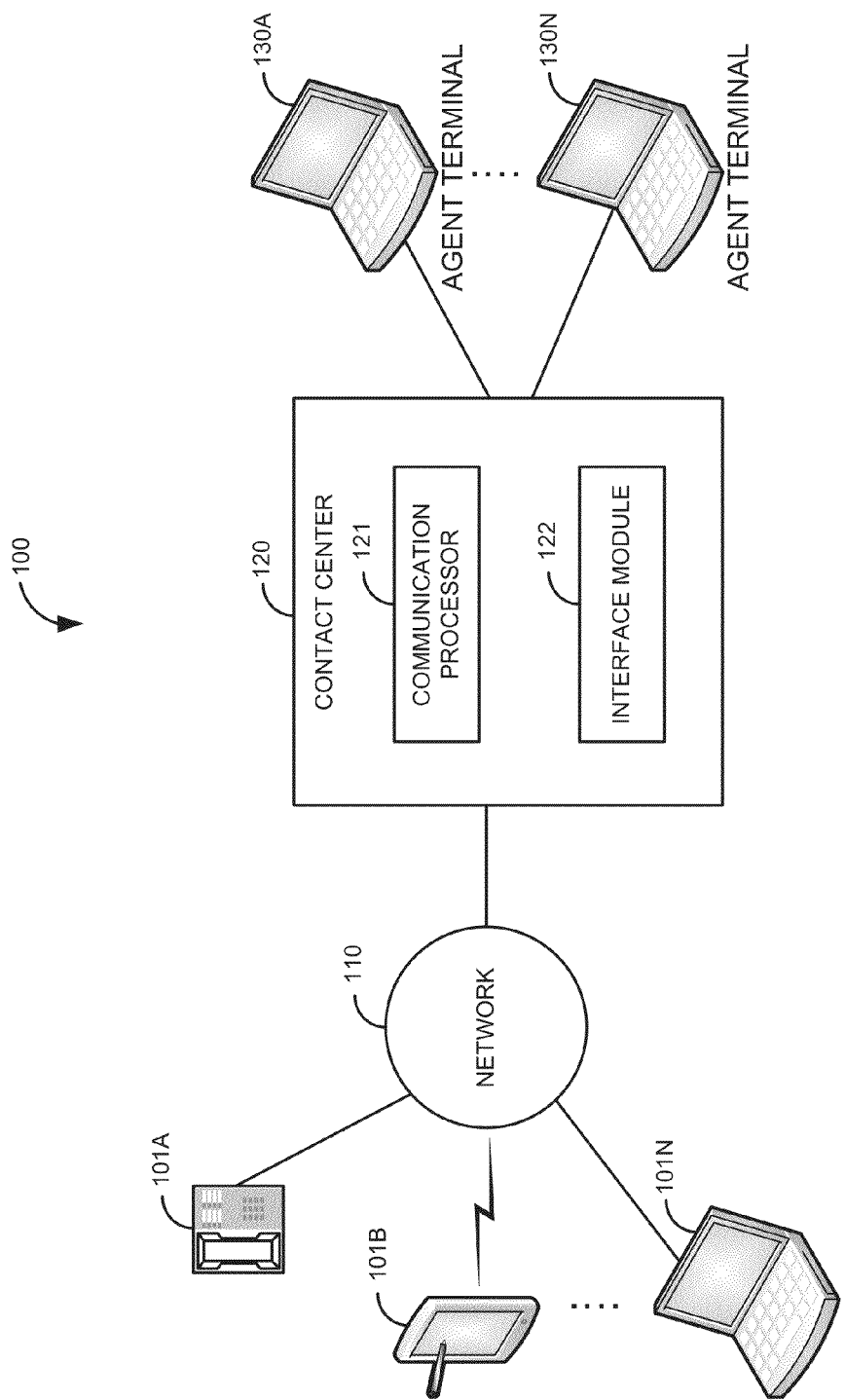
FIG. 1 is a block diagram of a first illustrative system that allows an agent to select which communications the agent will handle in a contact center.

FIG. 1 is a block diagram of a first illustrative system 100 that allows an agent to select which communications the agent will handle in contact center 120. The first illustrative system 100 comprises communication devices 101A-101N, network 110, contact center 120, and agent terminals 130A-130N. Communication devices 101A-101N can be any type of device that can communicate with contact center 120, such as a Personal Computer (PC), a tablet computer, a cellular telephone, a Personal Digital Assistant (PDA), a telephone, a video phone, a laptop computer, and the like. In this illustrative example, there are three communication devices 101A-101N connected to network 110. However, any number of communication devices 101 can be connected to network 110 to communicate with contact center 120. Communication devices 101A-101N are shown connecting to network 110. Alternatively, a communication device 101 can connect directly to contact center 120.

Network 110 can be any network that can send and receive communications, such as the Internet, a Wide Area Network (WAN), a Local Area Network (LAN), the Public Switched Telephone Network (PSTN), a packet switched network, a circuit switched network, a cellular network, a combination of these, and the like. Network 120 can use a variety of protocols, such as Ethernet, Internet Protocol (IP), Session Initiation Protocol (SIP), Integrated Services Digital Network (ISDN), and the like.

Contact center 120 can be any type of contact center 120 that can receive from and/or send communications to customers, such as a call center, a video call center, an email contact center, an Instant Message (IM) contact center, a social network contact center and the like. Contact center 120 can handle various types of communications, such as voice communications, video communications, email communications, Instant Message (IM) communications, text communications, and the like. Contact center 120 can handle in-bound communications and/or out-bound communications. Contact center 120 further comprises communication processor 121 and interface module 122.

Communication processor 121 can be any hardware/software that can process communications, such as a Private Branch Exchange (PBX), a call processor, a router, an email server, an Instant Message (IM) server, a video switch, a combination of these, and the like. Communication processor 121 is shown as part of contact center 120, however, communication processor 121 may be external to contact center 120 or distributed.

Interface module 122 can be any hardware/software that can interface with agent terminal 130 to provide an interactive user interface in agent terminal 130. For example, interface module 122 can be a video driver, a software application, a video card in agent terminal 130, a software program running in agent terminal 130, a combination of these, and the like. Interface module 122 is shown in contact center 120; however, interface module may be integrated into agent terminal 130.

Agent terminal 130A-130N can be any type of device that can present information to a contact center agent, such as a Personal Computer (PC), a terminal, a tablet computer, a cellular telephone, a Personal Digital Assistant (PDA), a telephone, a video phone, a laptop computer, and the like. In this illustrative example, there are two agent terminals 130A-130N shown in FIG. 1. However, any number of agent terminals 130 may be connected to contact center 120.

Multiple (a plurality of) communication requests from communication devices 101A-101N are received at communication processor 121. The communication requests can be based on a party initiating (an initiator) a voice call, initiating a video call, sending an email, sending a text, initiating an Instant Message session, posting on a blog, and the like. The communication requests can be for the same type of communications or for different types of communications. For example, the communication requests can comprise different types of communication requests, such as voice communication requests, video communication requests, text communication requests, email communication requests, Instant Message communication requests, and/or the like. Alternatively, the communication requests can all be of the same type of communications. For instance, the communication requests can all be voice communication requests. A communication request can any type of indication of a request to communicate, such as a Session Initiation Protocol (SIP) Invite to set up a voice or video call, a request to establish a Transmission Communication Protocol (TCP) connection, a ring signal, an indication of an incoming call, receipt of a packet, receipt of an incoming email message, a request to start an Instant Message session, a receipt of a text message, and/or the like.

Figure 6:
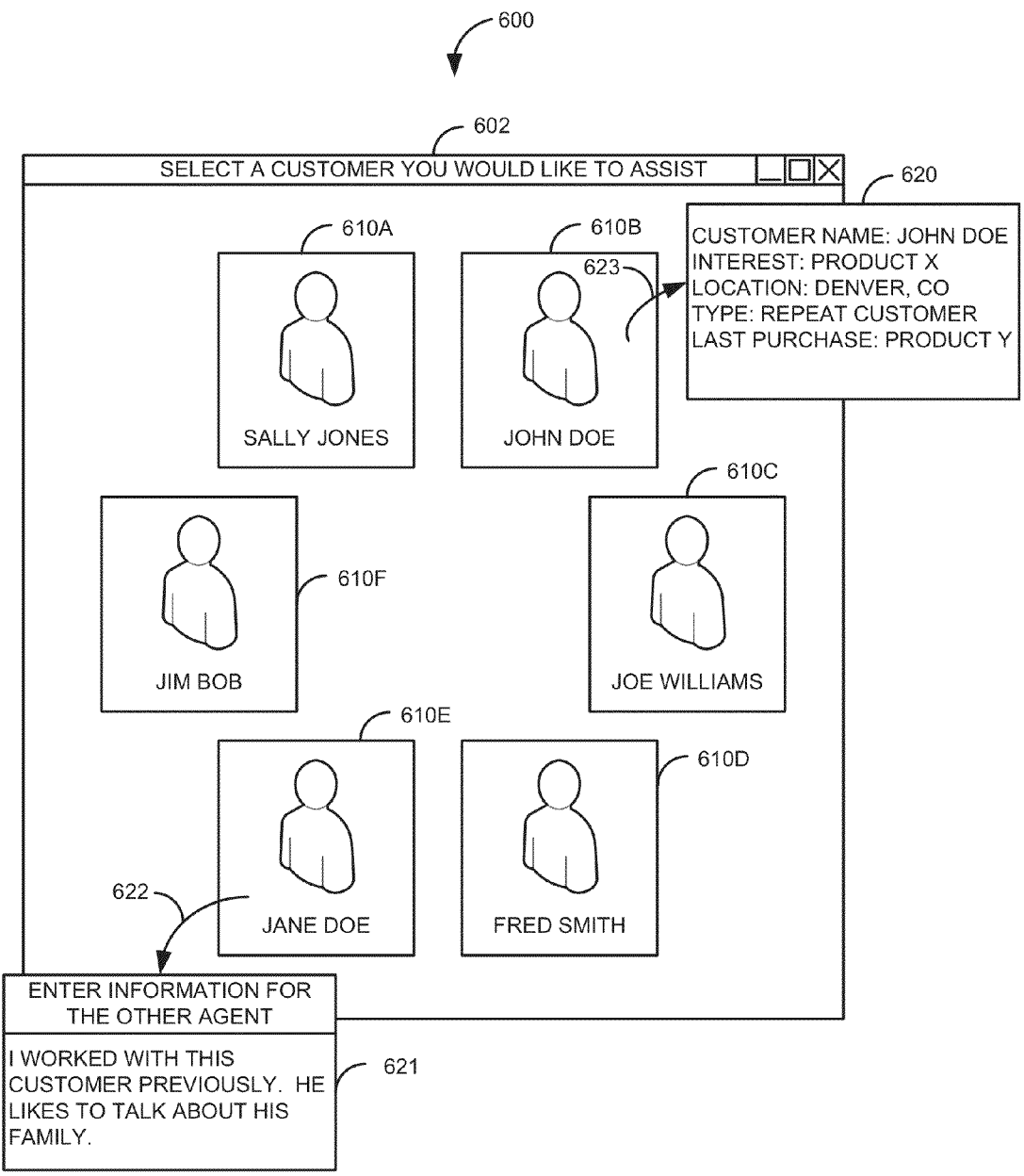
FIG. 6 is a diagram of a graphical user interface for selecting which communications an agent will handle in a contact center.

Interface module 122 presents the plurality of communication requests to the agent via agent terminal 130. The communication requests can be presented to the agent in various ways. For example, the communication requests can be presented in a list, as a rolodex that the agent can scroll through, using pictures (as shown in FIG. 6), as squares or objects on a video screen, as avatars, and the like. If there are multiple agents at agent terminals 130A-130N, the communication requests can be presented to all or a portion of the agents via agent terminals 130A-130N.

The agent selects one of the communication requests. This can be accomplished in various ways, such as a mouse click, a selection on a touch screen, an audio indication (i.e., by the agent saying the name of the customer who initiated the communication), and the like. The agent can select more than one of the communication requests. For example, the agent can select two of the communication requests. This can be handled in various ways. In one embodiment, the first selection is routed to the agent and the second selection is placed in a queue for the agent. The selection(s) by the agent are received by interface module 122.

In response to receiving the selection(s), communication processor 121, establishes a communication between the agent and the initiator of the communication request. If the communication request is for a voice communication, communication processor 121 establishes a voice communication between the initiator of the communication request (typically a customer) and the agent. Video communications are established in a similar manner as voice communication. If the communication request is for an email communication, a communication is established via email to the initiator and the agent. Likewise, a similar process can be used for Instant Message (IM) and text communications.

Figure 2:
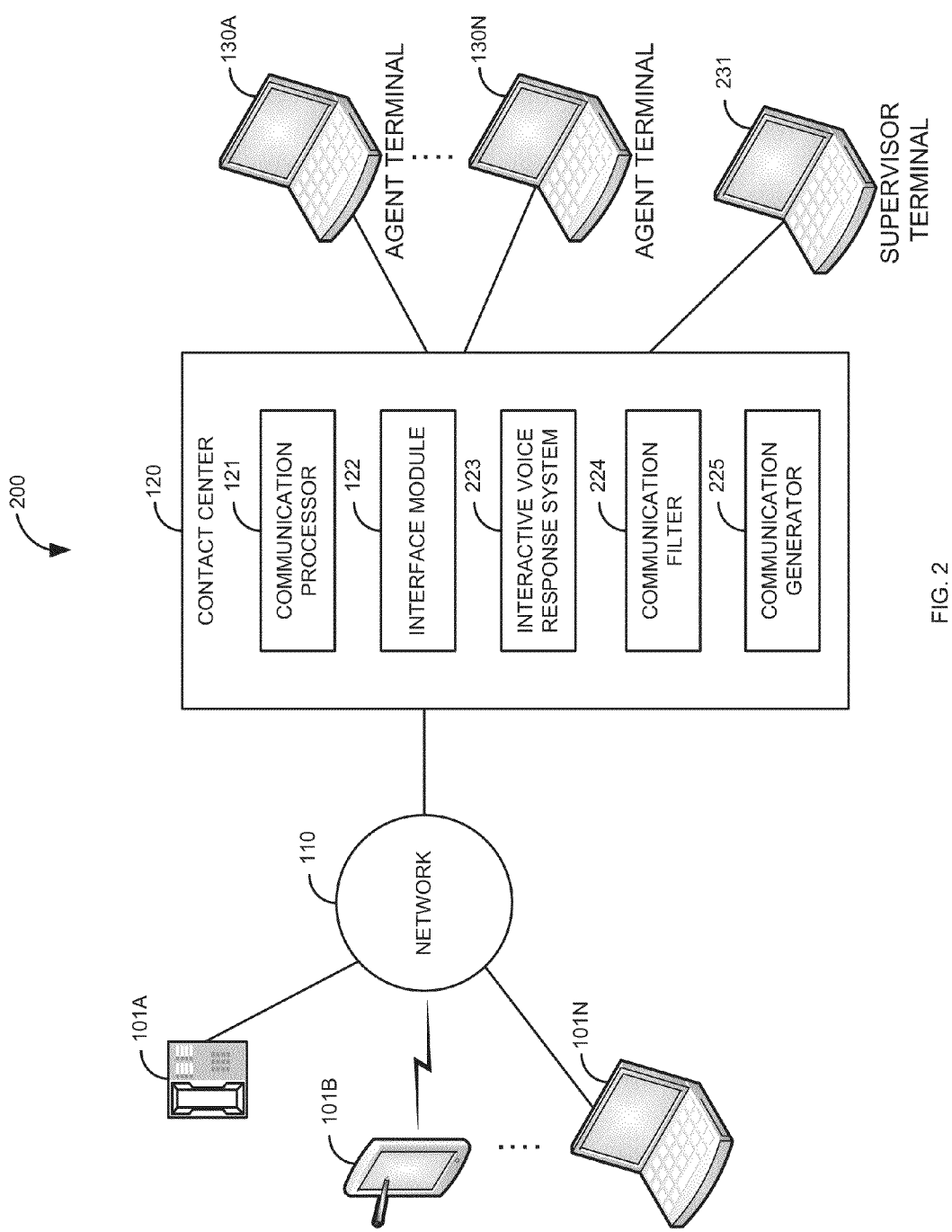
FIG. 2 is a block diagram of a second illustrative system that allows an agent to select which communications the agent will handle in a contact center.

FIG. 2 is a block diagram of a second illustrative system 200 that allows an agent to select which communications the agent will handle in contact center 120. The second illustrative system 200 comprises communication devices 101A-101N, network 110, contact center 120, agent terminals 130A-130N, and supervisor terminal 231. In this illustrative example, contact center 120 comprises communication processor 121, interface module 122, Interactive Voice Response (IVR) system 223, communication filter 224, and communication generator 225.

IVR system 223 can be any hardware/software that can interact with a person via voice. IVR system 223 may provide various menus in order to get information from a customer calling contact center 120, such as the customer's name, a company name, a reason why the customer is calling, a credit card number, and/or the like. Communication filter 224 can be any hardware/software that can filter communication in contact center 120. For instance, communication filter 224 can work in conjunction with communication processor 121 to filter which communication requests are presented to the agents. Communication generator 225 can be any hardware/software that can generate out-bound voice, video, and/or text communications. For example, communication generator 225 can be a predictive dialer for voice or video calls, an email system, an Instant Message (IM) system, a text message system, and/or the like.

Multiple (a plurality of) communication requests from communication devices 101A-101N are received at communication processor 121. Interface module 122 presents the plurality of communication requests to the agent via agent terminal 130. The communication requests that are presented to the agents at agent terminals 130A-130N can be filtered by communication filter 224. How the communications are filtered may be based on different types of information, such as a product type, a defined grouping, a prior interaction with a group of agents, a geographic location of a caller, a language of the caller, a language of an email, and/or the like.

For example, when customers call into contact center 120, the customers select a product type that they want to discuss via IVR system 223. Communication filter 224 filters out all call requests that indicate products other than product X. Interface module 122 presents only the call requests dealing with product X to the agents at agent terminals 130A-130N. The agent selects one (or more) of the communication requests. The selection(s) by the agent are received by interface module 122. In response to receiving the selection(s), communication processor 121, establishes a communication between the agent and an initiator of the communication request.

In addition, a supervisor can override the agent and select a communication request (that was not selected by the agent) for the agent to handle. For instance, the supervisor may want to force the agent to handle a request that has been on hold for a long period of time. The supervisor, via supervisor terminal 231 can select one or more of the communication requests. Interface module 122 receives the selection from the supervisor and automatically establishes a communication between the agent and the initiator of the communication.

The above example describes a call center 120 that supports in-bound communications. The second illustrative system 200 also supports out-bound communications. Communication generator 225 generates a plurality of communication requests. A communication request can be a request to initiate a voice communication, a video communication, an Instant Message (IM) communication, an email communication, and/or a text message communication. For example, communication generator 225 can generate multiple call requests to specific telephone numbers (an address). The communication requests are presented by interface module 122 to an agent via agent terminal 130. If there are multiple agents at agent terminals 130A-130N, the communication requests can be presented to all or a portion of the agents via agent terminals 130A-130N. The communication requests may be filtered by communication filter 224 in a similar manner as described for in-bound calls. For example, the communication requests may be filtered based on various types of information, such as a grouping of interests of who the out-bound communications are going to, a prior interaction with the agent, and/or other criteria.

The agent selects at least one of the communication requests via agent terminal 130. Interface module 122 receives the selection of the communication request(s). In response to receiving the selection of the communication request(s), communication processor 121 initiates a communication to an address of the communication request. An address of the communication request may vary based on the type of communication. For example, a voice or video communication may use a telephone number or an Internet Protocol (IP) address to initiate a voice call. An email communication may use an email address to initiate the communication. An Instant Message (IM) communication may use an instant message address. A text message communication may use a telephone number to initiate the text message. Other types of addresses that can be used can include, but are not limited to, an Ethernet address, a Media Access Layer (MAC) address, a network address, a Session Initiation Protocol (SIP) address, an H.323 address, a video protocol address, a social network address, and/or the like.

The description for FIG. 2 describes the use of an in-bound/out-bound contact center 120. The illustrative embodiment described in FIG. 2 may comprise, as an alternative, an out-bound only contact center 120 or an in-bound only contact center 120.

In a similar manner as described above for an in-bound communication, a supervisor can override the agent and select an out-bound communication request (that was not selected by the agent) for the agent to handle. The supervisor, via supervisor terminal 231 can select one or more of the communication requests. Interface module 122 receives the selection from the supervisor and automatically establishes a communication between the agent and the initiator of the communication.

Figure 3:
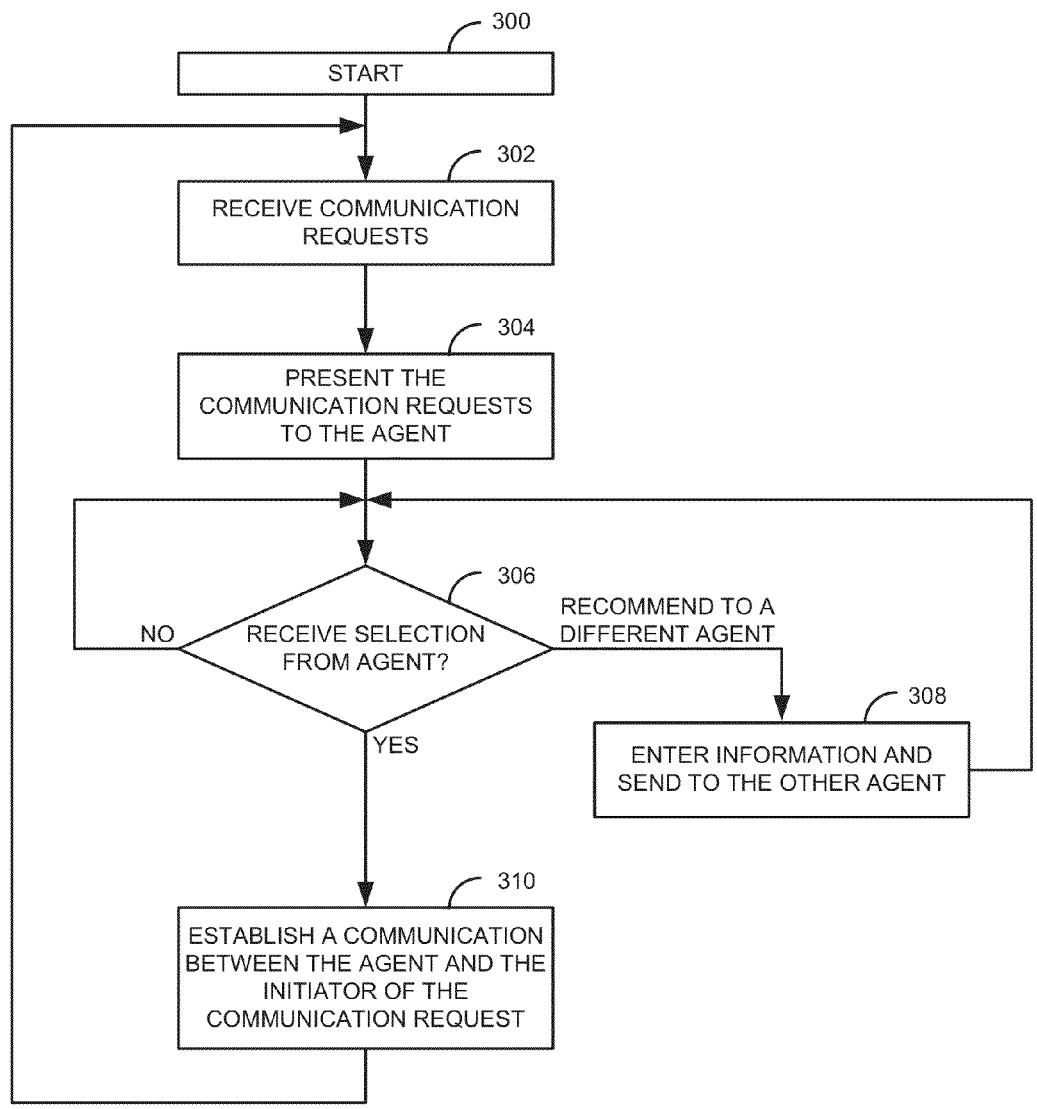
FIG. 3 is a flow diagram of a method that allows an agent to select which communications the agent will handle in a contact center.

FIG. 3 is a flow diagram of a method that allows an agent to select which communications the agent will handle in contact center 120. Illustratively, communication devices 101A-101N, contact center 120, communication processor 121, interface module 122, Interactive Voice Response (IVR) system 223, communication filter 224, communication generator 225, agent terminals 130A-130N, and supervisor terminal 231 are stored-program-controlled entities, such as a computer or processor, which performs the methods of FIGS. 3-6 and the processes described herein by executing program instructions stored in a tangible computer readable storage medium, such as a memory or disk.

The process starts in step 300. Multiple (a plurality of) communication requests from communication devices 101A-101N are received 302 at communication processor 121. Interface module 122 presents 304 the plurality of communication requests to the agent via agent terminal 130. Interface module 122 waits in step 306 to receive a selection of one or more of the communication requests from the agent. If interface module 122 does not receive a selection in step 306, the process continues to wait in step 306.

If the agent selects a communication request to recommend to another agent in step 306, the agent can optionally enter information 308, and send the communication request to the other agent. The process then goes back to step 306. An agent may recommend a communication request to another agent for various reasons. For example, the agent may be busy servicing a different communication request and may think that the other agent would be a good fit to handle the communication request. If the agent selects a communication request(s) in step 306, the selection(s) by the agent are received by interface module 122. In response to receiving the selection(s), communication processor 121 establishes 310 a communication between the agent and an initiator of the communication request. The process goes to step 302.

Figure 4:
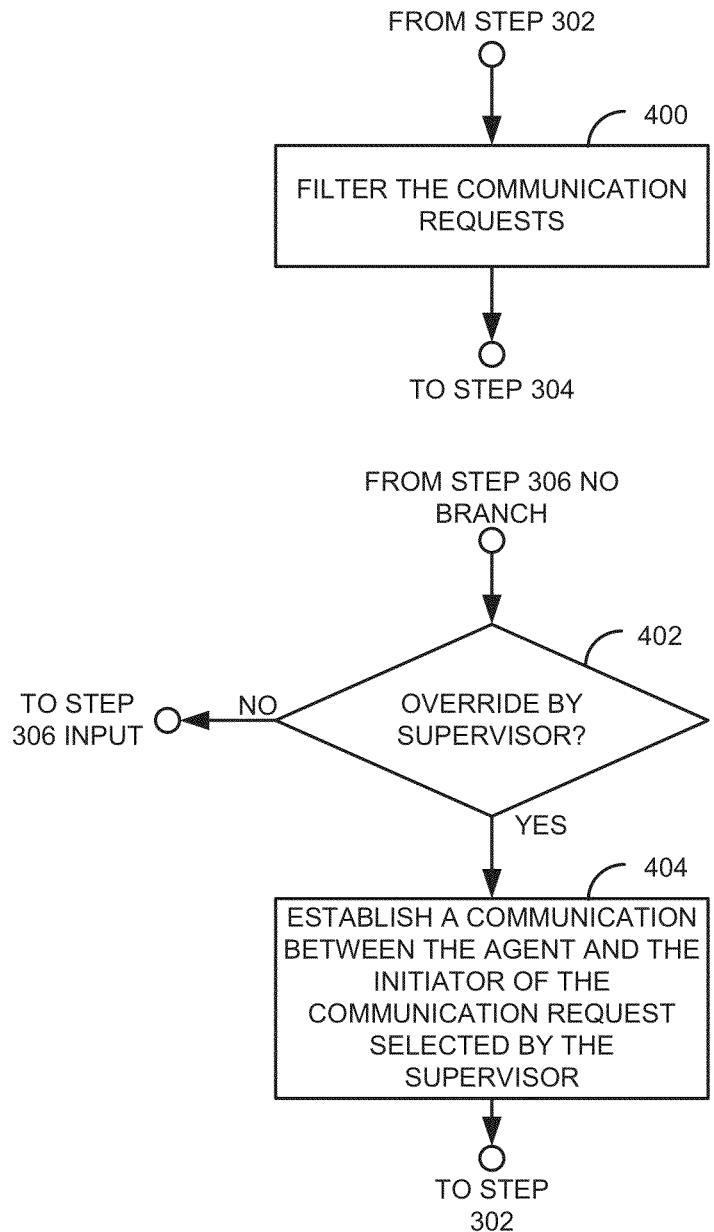
FIG. 4 is a flow diagram of a method for filtering requests and overriding a request by a supervisor.

FIG. 4 is a flow diagram of a method for filtering requests and overriding a request by a supervisor. The steps of FIG. 4 are optional steps that can be added to the method of FIG. 3. After step 302, communication filter 224 filters 400 the communication requests. The process goes to step 304. Communication filter 224 can filter the communication requests differently for each agent. For example, one group of agents may support product X and another group of agents may support product Y. Communication filter 224 can present the communication requests for product X to one group of agents and the communication requests for product Y to a different group of agents. In this example, an agent may support both products and see communication requests for both product X and product Y. The communication requests that are presented to individual agents can vary based on other criteria, such as a ranking of the agent's capabilities and/or an agent's prior interaction with the customer. For instance, if the agent was rated poorly by the customer in a previous interaction with the customer (e.g., by taking a survey), the communication request from the customer may not show up in the communication requests for the agent that was rated poorly; in the meantime, the same communication request can be presented to other agents who were rated highly by the customer or have not interacted with the customer previously.

Figure 5:
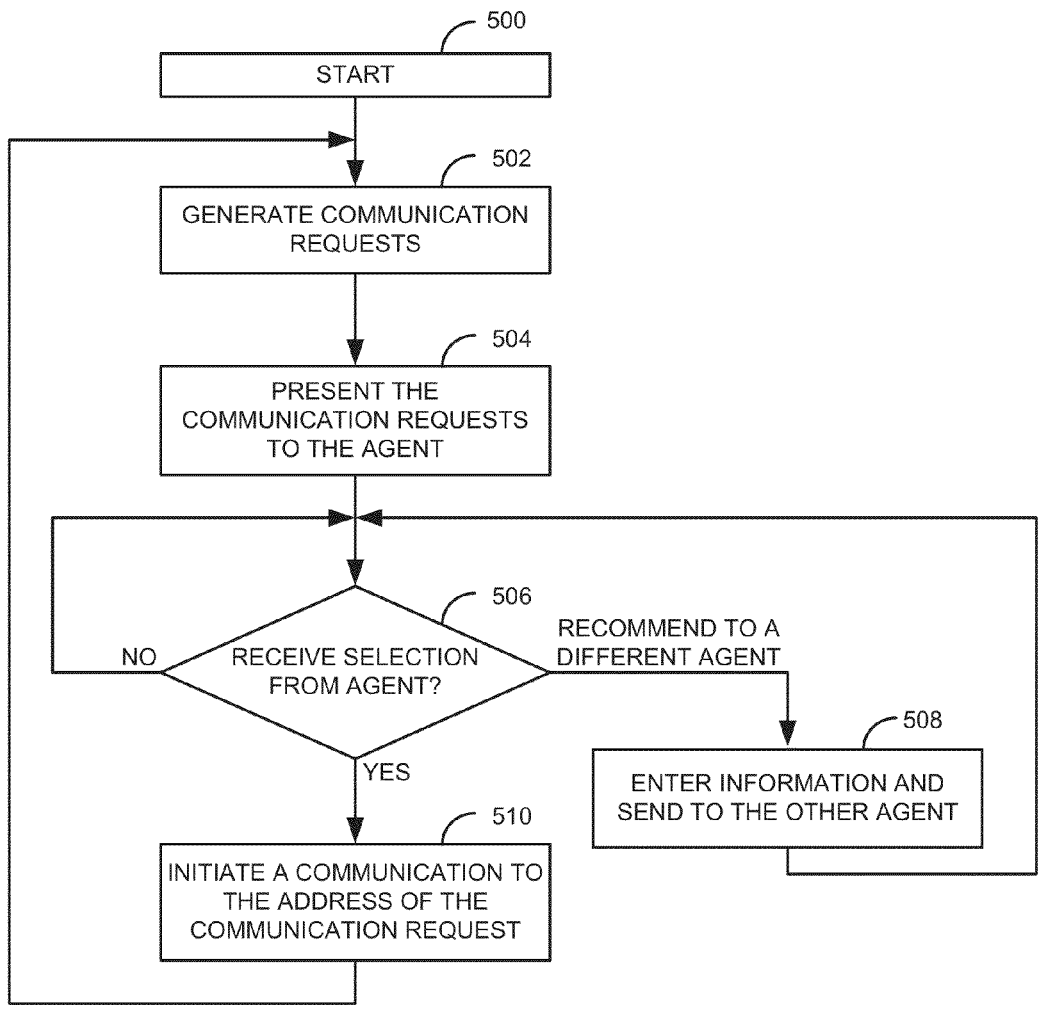
FIG. 5 is a flow diagram of a method for allowing an agent to select which communications the agent will handle in a contact center.

The process of filtering described above can also be used for the out-bound call center that is described in FIG. 5. In this exemplary embodiment, filtering step 400 is placed between steps 502 and 504.

After step 306 (no branch), interface module 122 waits for a selection by a supervisor to override a selection by the agent in step 402. If no override selection has been made by the supervisor in step 402, the process goes to the input of step 306. Otherwise, if interface module 122 receives an override in step 402, a communication is established 404 between the agent and the initiator of the communication request selected by the supervisor. The process goes to step 302. The supervisor may want to override the agent for various reasons, such as the supervisor wants to prioritize a particular communication request, the communication request has waited for a defined period of time, and/or the like.

The process of overriding by a supervisor described above can also be used for the out-bound call center that is described in FIG. 5. In this exemplary embodiment, instead of coming from the no branch on step 306, the process comes from step 506 (no branch). If the process is not overridden, instead of going to step 306 (input), the process goes to the input of step 506. After step 404, the process goes to step 502 instead of step 302.

FIG. 5 is a flow diagram of a method for allowing an agent to select which communications the agent will handle in contact center 120. The process starts in step 500. Communication generator 225 generates 502 communication requests. Interface module 122 presents 504 the communication requests to the agent via agent terminal 130. Interface module 122 waits in step 506 to receive a selection of one or more of the communication requests from the agent. If interface module 122 does not receive a selection in step 506, the process continues to wait in step 506.

If the agent selects a communication request to recommend to another agent in step 506, the agent can optionally enter 508 information and send the communication request to the other agent. The process then goes back to step 506. If the agent selects a communication request(s) in step 506, the selection(s) by the agent are received by interface module 122. In response to receiving the selection(s), communication processor 121, initiates 510 a communication to an address of the communication request. The process goes to step 302.

FIG. 6 is a diagram of a graphical user interface 600 for selecting which communications an agent will handle in contact center 120. Graphical user interface 600 comprises picture communication request window 602, picture representations 610A-610F, customer information window 620, and recommendation window 621. Communication request window 602 is presented to the agent in steps 304 and 504. Picture representations 610A-610F are visual representations of communication requests. For example, picture representations 610A-610C can represent voice communication requests and picture representations 610D-610F can represent email communications. In this illustrative example, picture representations 610A-610F are shown with pictures that represent the initiator of the communication request. The picture representation 610A-610F can be an actual picture or may be an avatar representation of the initiator of the communication request. In yet other embodiments, the communication requests can be shown in different ways, such as in a list, in a rolodex, or some other method for graphically representing communication requests.

When the agent selects one (or more) of the communication request (by selecting one of the picture representations 610), a communication is established with the initiator of the communication request for an in-bound communication. For an out-bound communication, a communication is initiated to an address of the communication request. Once the communication request is selected, the picture representation 610 for the communication request will be removed from communication request window 602. As new communication requests are received (or generated), the new communication requests are added as new picture representations 610 into communication request window 602.

Communication request window 602 may only be presented to the agent periodically. Communication request window 602 may only be presented to an agent when the agent finishes up with the current communication. For example, if the agent is handling a video communication, once the agent has closed the current video communication, communication request window 602 is displayed to the agent.

Communication requests that are presented to the agent can be customized based on different reasons. For instance, if a customer represented by picture representation 610A has been waiting for a long period of time, the color of the background of the picture could change to another color, such as red, to indicate to the agent that the communication request needs to be handled immediately. Alternatively, the background color of an individual picture representation 610 can be changed based on a prior interaction with the agent. If the agent had a good interaction with the customer, the background color for the picture representation can be colored green. If the interaction was bad, the background may be a different color, such as black (signifying for the agent not to select the communication request). The same picture representation 610 may have a different background color based on the agent. For instance, if agent X had a bad previous interaction with the customer represented by picture representation 610D and agent Y has never interacted with the customer represented by picture representation 610D, agent X may see picture representation 610D with a black background and agent Y may see picture representation 610D with a green background.

If an agent wants to get additional information about the initiator of the communication, the agent can select 623 (i.e., right clicking vs. left clicking to establish a communication) one of the picture representations and bring up customer information window 620. In this illustrative example, the agent selected 623 picture representation 610B to bring up customer information window 620. The agent can use the information in customer information window 620 to determine if selecting the initiator of the communication request is a good choice.

If an agent recommends 622 a communication request to another agent, as described in steps 308 and 508 (e.g., by clicking on picture representation 610E), the agent can enter information to aid the other agent by entering the information in recommendation window 621. In this illustrative example, the agent entered information that indicates that the agent has previously worked with the customer and the customer likes to talk about his family. The information entered by the agent is presented to the other agent. This can be done via a pop-up window (not shown) that is presented to the other agent.

Herein, the phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

Herein, the term "a," "an," or another entity refers to one or more of that entity. As such, the terms "a" (or "an"), "one or more" and "at least one" can be used interchangeably herein. It is also to be noted that the terms "comprising," "including," and "having" can be used interchangeably.

Of course, various changes and modifications to the illustrative embodiment described above will be apparent to those skilled in the art. These changes and modifications can be made without departing from the spirit and the scope of the system and method and without diminishing its attendant advantages. The above description and associated Figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of managing a contact center comprising:
   receiving, in a communication processor, a plurality of communication requests;
   presenting, via an interface module, the plurality of communication requests to an agent as a picture representation of an initiator of each of the plurality of communication requests, wherein the agent can select the picture representation of one of the initiators of the communication requests to present additional information about the one of the initiators of the communication requests;
   receiving, at the interface module, a selection of at least one of the plurality of communication requests by the agent; and
   responsive to receiving the selection of the at least one of the plurality of communication requests, establishing in the communication processor, a communication between the agent and an initiator of the at least one of the plurality of communication requests,
   wherein the agent comprises a plurality of agents and the presenting of the plurality of communication requests is presented to the plurality of agents;
   wherein which of the communication requests are presented to each of the plurality of agents are customized based at least in part on a prior interaction with an initiator of an individual one of the plurality of communication requests.

2. The method of claim 1, further comprising the step of receiving, at the interface module, a selection from one of the plurality of agents to recommend one of the plurality of communication requests to another one of the plurality of agents, wherein the selection further comprises the one of the plurality of agents providing information.

3. The method of claim 1, wherein the plurality of communication requests are filtered, by a communication filter, based on information about the plurality of communication requests.

4. The method of claim 1, further comprising receiving, by the interface module, a selection by a supervisor to automatically establish a communication between the agent and an initiator of a non-selected one of the at least one of the plurality of communication requests.

5. A method of managing a contact center comprising:
   generating, in a communication generator, a plurality of communication requests;
   presenting, via an interface module, the plurality of communication requests to a plurality of agents as a picture representation of an initiator of each of the plurality of communication requests, wherein the agent can select the picture representation of one of the initiators of the communication requests to present additional information about the one of the initiators of the communication requests;
   receiving, at the interface module, a selection of at least one of the plurality of communication requests by the agent; and
   responsive to receiving the selection of the at least one of the plurality of communication requests, initiating from the communication processor, a communication to an address of the selected one of the plurality of communication requests,
   wherein which of the communication requests are presented to each of the plurality of agents are customized based on a prior interaction with an initiator of an individual one of the plurality of communication requests.

6. The method of claim 5, further comprising receiving, by the interface module, a selection by a supervisor to automatically establish a communication between the agent and an initiator of a non-selected one of the at least one of the plurality of communication requests.

7. A system for managing a contact center comprising:
   a communication processor configured to receive a plurality of communication requests and in response to receiving a selection of at least one of the plurality of communication requests by an agent, establish a communication between the agent and an initiator of the at least one of the plurality of communication requests; and
   an interface module configured to present the plurality of communication requests to the agent as a picture representation of an initiator of each of the plurality of communication requests, wherein the agent can select the picture representation of one of the initiators of the communication requests to present additional information about the one of the initiators of the communication requests, and receive the selection of the at least one of the plurality of communication requests by the agent,
   wherein the agent comprises a plurality of agents and the presenting of the plurality of communication requests is presented to the plurality of agents;
   wherein which of the communication requests are presented to each of the plurality of agents are customized based on a prior interaction with an initiator of an individual one of the plurality of communication requests.

8. The system of claim 7, wherein the interface module is further configured to receive a selection from one of the plurality of agents to recommend one of the plurality of communication requests to another one of the plurality of agents, wherein the selection further comprises the one of the plurality of agents providing information.

9. The system of claim 7, further comprising a communication filter configured to filter the plurality of communication requests based on information about the plurality of communication requests.

10. The system of claim 7, wherein the interface module is further configured to receive a selection by a supervisor to automatically establish a communication between the agent and an initiator of a non-selected one of the at least one of the plurality of communication requests.

11. A system for managing a contact center comprising:
a communication generator configured to generate a plurality of communication requests;
a communication processor configured to initiate a communication to an address of a selected communication request of the plurality of communication requests in response to an interface module receiving the selection of the communication request of the plurality of communication requests; and
the interface module configured to present the plurality of communication requests to an agent as a picture representation of an initiator of each of the plurality of communication requests, wherein the agent can select the picture representation of one of the initiators of the communication requests to present additional information about the one of the initiators of the communication requests, and receive the selection of the at least one of the plurality of communication requests by the agent,
wherein the agent comprises a plurality of agents and the presenting of the plurality of communication requests is presented to the plurality of agents;
wherein which of the communication requests are presented to each of the plurality of agents are customized based on a prior interaction with an initiator of an individual one of the plurality of communication requests.

12. The system of claim 11, wherein the interface module is further configured to receive a selection by a supervisor to automatically establish a communication between the agent and an initiator of a non-selected one of the at least one of the plurality of communication requests.

* * * * *